Nov. 18, 1958 G. W. GERSTUNG 2,860,722
SILENCER
Filed Aug. 23, 1954 2 Sheets-Sheet 1
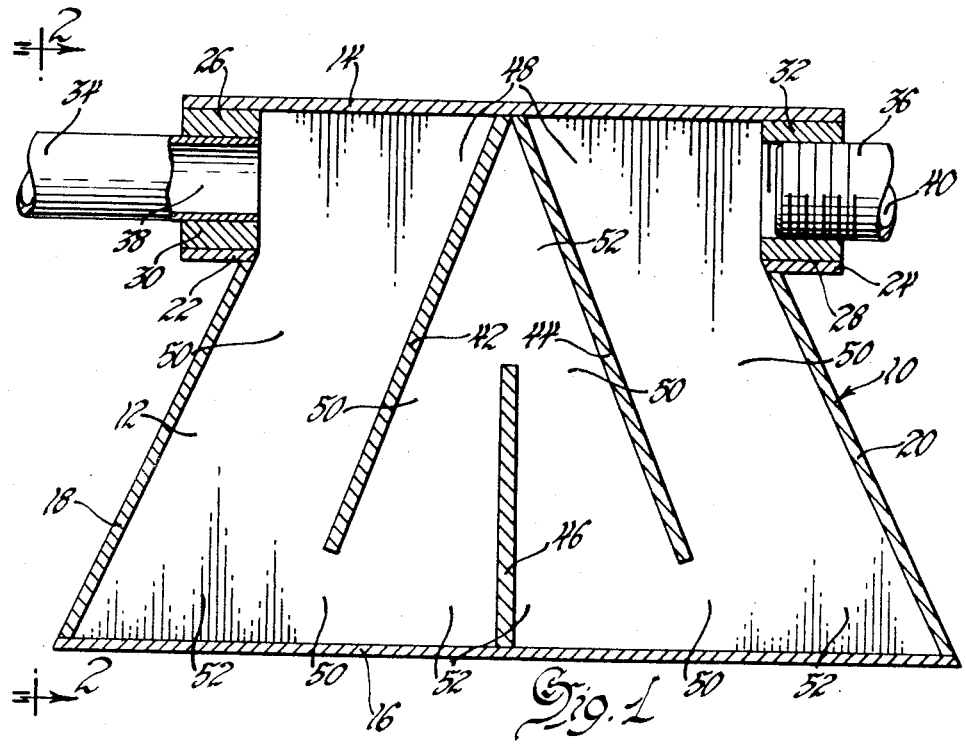
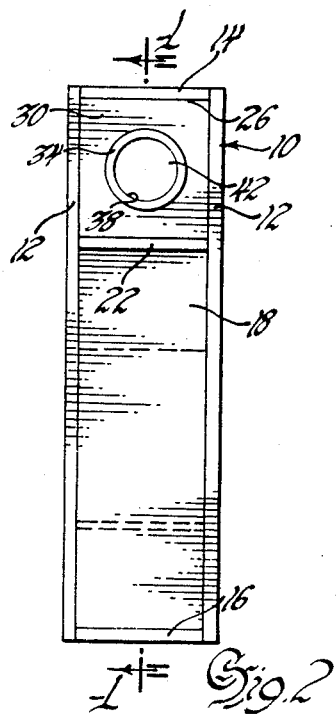
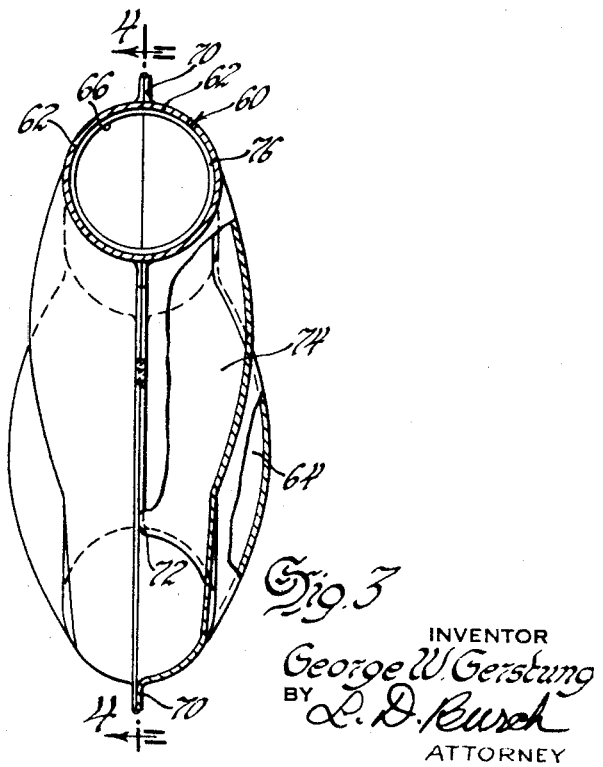
INVENTOR
George W. Gerstung
BY L. D. Burch
ATTORNEY

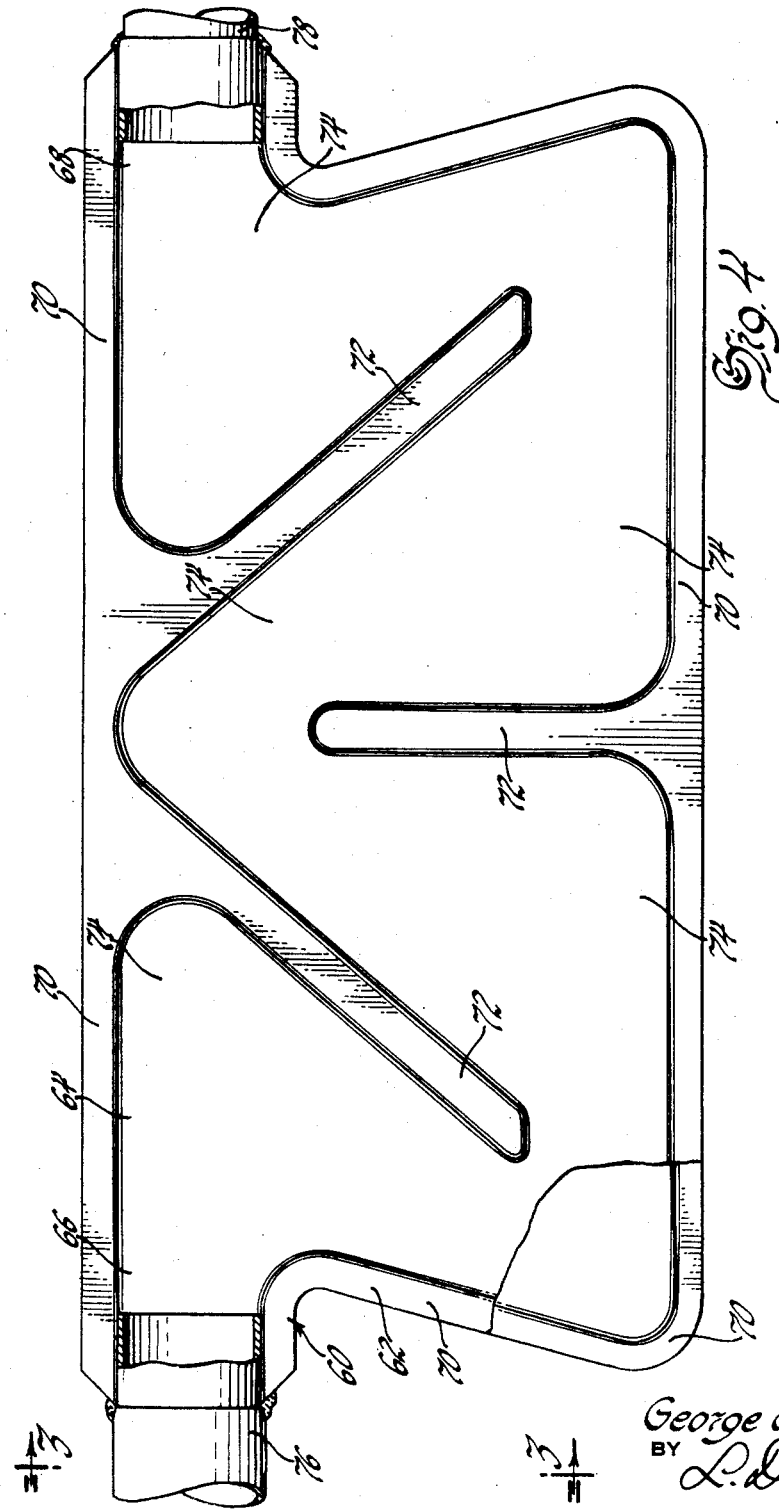

United States Patent Office 2,860,722
Patented Nov. 18, 1958

2,860,722
SILENCER

George W. Gerstung, Lockport, N. Y., assignor to General Motors Corporation, Detroit, Mich., a corporation of Delaware Application August 23, 1954, Serial No. 451,562

5 Claims. (Cl. 181—68)

This invention relates to muffling devices, and more particularly to a muffling device adapted to reduce the noises produced by escaping gases in air relief lines, internal combustion engine exhaust, etc.

Modern factories and manufacturing plants make considerable use of air-operated equipment which necessitates exhausting the high-pressure air at numerous points throughout the building. This escaping high-pressure air produces high pitch intermittent noises which are very disturbing and to a great extent responsible for employe fatigue.

Many muffling devices have been devised and employed for the purpose of reducing this high pitch intermittent noise, but experience has shown that very few of these devices satisfactorily reduce these noises throughout the complete frequency range included in the "damage risk curve to workers" established by plant safety departments. The problem of muffling objectionable noises produced by various machines and engines is a rather complicated one. The theory involved is extremely complex and for this reason muffling devices do not always function as efficiently as claimed.

It is now proposed to provide a muffling device particularly adapted for efficiently quieting the above high pitch intermittent noises, although the proposed device has also been found to be adapted to quiet the exhaust of engines and the like. The proposed device is of extremely simple design which lends itself to manufacture at a cost greatly reduced from that of devices presently used.

The efficiency of the proposed muffler is due to the elimination as far as possible of parallel walls and the provision therein of an exhaust passage alternating in vertical directions between the exhaust inlet and outlet located near the top of the device at opposite ends thereof, with the exhaust passage also having alternately increasing and decreasing cross-sectional areas. The greatly reduced cost of manufacture of the proposed device is due to the fact that in the case of the embodiment thereof adapted for use with factory installations, the device may be made from standard materials of simple shape such as a few pieces of plywood and ordinary pipe.

The modification thereof adapted for use with automobiles may be constructed from a pair of identical sheet metal stampings formed in a manner to require only the placing of the stampings together so that peripheral and internal flanges thereon engage one another to form the exhaust passage and welding the stampings along the flanges provided around the periphery. Thereafter tubular members may be welded at each end to complete the inlet and the outlet for the exhaust passage.

In the drawings:

Figure 1 is a vertical cross-sectional view through the length of a muffler device embodying the invention taken on the plane of line 1—1 of Figure 2 and looking in the direction of the arrows.

Figure 2 is an end elevational view of the device shown by Figure 1 taken in the plane of line 2—2 of Figure 1 looking in the direction of the arrows.

Figure 3 is an end elevational view with parts thereof broken away to better illustrate internal details of construction of a modification of the invention. Figure 3 is taken on the plane of line 3—3 of Figure 4 looking in the direction of the arrows.

Figure 4 is a sectional view taken in the plane of line 4—4 of Figure 3 looking in the direction of the arrows.

Referring to the drawings in greater detail a muffler 10 embodying the invention and adapted for use with high pressure air lines and the like may comprise a pair of side walls 12 which may be parallel to one another, a pair of top and bottom walls 14 and 16 which may likewise be parallel to one another and a pair of end walls 18 and 20 disposed obliquely to one another. A pair of walls 22 and 24 disposed near the top of each end of the muffler 10 provide square openings 26 and 28 constituting inlet and outlet openings respectively for the muffler. The bushings 30 and 32 may be inserted into these inlet and outlet openings to receive the pipe sections 34 and 36 which may be secured in the bushings in any suitable manner to provide interchangeable inlet and outlet passages 38 and 40 and to complete the external structure of the muffler 10. A pair of baffles 42 and 44 diverging downwardly from their line of juncture at the top wall 14 may be provided within the muffler. The baffles 42 and 44 are preferably straight and disposed obliquely to each other and to all of the walls of the muffler except the two side walls 12. A single baffle 46 preferably straight and extending perpendicularly from the bottom wall 16 of the muffler and between the pair of baffles 42 and 44 completes the internal structure of the muffler. It is apparent that this modification of the invention may be easily constructed entirely from inexpensive materials such as ordinary plywood or any other suitable construction material and lengths of standard pipe or tubing. Furthermore, the muffler is symmetrical as far as the exhaust passage is concerned so that it does not matter at which end the gas to be muffled enters. Also, the muffler may be used in any position and not necessarily in the position in which it is shown in the drawings.

It will be noted that high pressure relief air or other noise-producing gaseous fluid which enters the inlet passage 38 or 40 is permitted to expand on entering the chamber of increased volume or portion of the conduit through the muffler of increased cross-section 48. The air then passes through a series of continuously decreasing and increasing volumes 50 and 52 in a vertically changing direction until the air is permitted to escape through the outlet passage 38 or 40. Though no attempt is here made to point out the specific engineering or scientific reasons for the efficient operation of this device, experimentation therewith has shown that, despite there being no restrictions to the air flow except for the change in direction thereof, the continuously increasing and decreasing volumes 52 and 50 provided by the non-parallel structure are very effective in causing the interference of sound waves and the destruction of noises. Also, it is now even more apparent that the above device is of extremely simple design and very inexpensive to construct and install.

The modification of the invention shown by Figures 3 and 4 is particularly adapted for use in muffling the exhaust of internal combustion engines. Such a muffler 60 may comprise a pair of identical sheet metal stampings 62, with each of said stampings having continuous depressions 64 formed therein. The depressions are bounded except at the interchangeable inlet and outlet openings 66 and 68 of the stamping, by peripheral and internal flanges 70 and 72 preferably lying in the same plane. The two identical stampings 62 may be placed together so that all the corresponding flanges 70 and 72 of each stamping engage one another, and the two stampings may then be welded along the peripheral flanges 70 to provide a hollow body having a continuous passage 74 therethrough of the same characteristics as in the device already described and shown by Figures 1 and 2. In addition however, non-parallelism between the walls of the present muffler and the alternating changes in volume of the passage therethrough is increased over that of the muffler shown by Figures 1 and 2 due to the curved non-parallel depressions 74 in the sheet metal stampings. Inlet and outlet conduits 76 and 78 may then be welded, or otherwise suitably fastened, at each end of the structure in the openings 66 and 68.

The operation of this modification of the invention is substantially the same as that of the modification shown by Figures 1 and 2. It is apparent that this device is especially adapted for use with internal combustion engines, since it is suited for high production methods of fabrication. Also, since engine exhaust contains condensible vapors it is necessary to fabricate such a muffler from moisture resistant materials.

It is apparent from the above specification and drawings that there has been provided a muffler device having the features of simple and inexpensive design and construction. The structure is light in weight and capable of being mass produced. Experimentation has proven this structure to be very efficient in quieting noises produced by high pressure air relief lines, internal combustion engine exhaust and the like.

What is claimed is:

1. A muffler comprising a trapezoidal body portion having a continuous single passage therethrough extending between interchangeable inlet and outlet openings located near a common edge and at opposite ends of said body, said body and said passage being substantially symmetrical about a vertical plane passage extending first obliquely away from and then toward both the axes of said inlet and said outlet openings and said vertical plane.

2. Air silencer means including a trapezoidal casing having divergent end walls and parallel top and bottom walls, inlet and outlet openings provided through opposite of said end walls near one of said top and bottom walls, and baffle plates within said casing disposed parallel to said divergent end walls and normal to said top and bottom walls for providing a tortuous passage between said inlet and outlet openings.

3. Air silencer means including a trapezoidal casing having divergent end walls and parallel top and bottom walls, axially aligned inlet and outlet openings provided through opposite of said end walls, intersecting baffle plates each disposed parallel to one of said divergent end walls and secured to one of said top and bottom walls, and a baffle plate secured normal to the other of said top and bottom walls and extended between said intersecting baffle plates.

4. Muffler means including a trapezoidal housing having divergent end walls and parallel top and bottom walls, axially aligned inlet and outlet openings provided through opposite of said end walls near the smaller of said top and bottom walls, and a pair of baffle plates each of which is parallel to different of said end walls, said baffle plates intersecting and being secured to one of said top and bottom walls, and another baffle plate secured normal to the other of said top and bottom walls and extending midway between said first-mentioned baffle plates.

5. Muffler means including a trapezoidal housing having parallel side, top and bottom walls and divergent non-parallel end walls, axially aligned interchangeable inlet and outlet openings provided through opposite of said end walls, intersecting non-parallel baffle plates secured to one of said top and bottom walls and being disposed parallel to the end wall adjacent thereto, and a baffle plate secured normal to the other of said top and bottom walls and extending between said non-parallel baffle plates, said baffle plates forming a tortuous passage through said housing having alternate contiguous chambers of increasing and decreasing volume.

References Cited in the file of this patent

UNITED STATES PATENTS

| 861,550 | Strang | July 30, 1907 |
| 1,461,039 | Leslie | July 10, 1923 |
| 1,695,375 | Heather | Dec. 18, 1928 |
| 2,484,826 | Harley | Oct. 18, 1949 |

FOREIGN PATENTS

| 453,546 | France | Apr. 7, 1913 |
| 416,247 | Great Britain | Mar. 12, 1934 |
| 620,862 | Great Britain | Mar. 31, 1949 |

UNITED STATES PATENT OFFICE
CERTIFICATE OF CORRECTION

Patent No. 2,860,722 November 18, 1958

George W. Gerstung

It is hereby certified that error appears in the printed specification of the above numbered patent requiring correction and that the said Letters Patent should read as corrected below.

Column 3, line 36, after "plane" insert -- passing transversely through said body midway between the ends thereof, said --.

Signed and sealed this 31st day of March 1959.

(SEAL)
Attest:

KARL H. AXLINE
Attesting Officer

ROBERT C. WATSON
Commissioner of Patents